(12) United States Patent
Gupta et al.

(10) Patent No.: US 9,106,974 B2
(45) Date of Patent: Aug. 11, 2015

(54) SYSTEM AND METHOD FOR STORING ADVERTISING DATA

(75) Inventors: Narendra K. Gupta, Dayton, NJ (US); Mazin Gilbert, Warren, NJ (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 2266 days.

(21) Appl. No.: 11/725,995

(22) Filed: Mar. 20, 2007

(65) Prior Publication Data
US 2008/0235740 A1    Sep. 25, 2008

(51) Int. Cl.
*H04N 7/173* (2011.01)
*H04N 21/81* (2011.01)
*H04N 21/433* (2011.01)

(52) U.S. Cl.
CPC ......... *H04N 21/812* (2013.01); *H04N 21/4331* (2013.01); *H04N 21/4332* (2013.01)

(58) Field of Classification Search
None
See application file for complete search history.

(56) References Cited

U.S. PATENT DOCUMENTS

| | | | |
|---|---|---|---|
| 6,240,555 B1 * | 5/2001 | Shoff et al. | 725/110 |
| 6,341,128 B1 | 1/2002 | Svedberg | |
| 7,096,486 B1 * | 8/2006 | Ukai et al. | 725/58 |
| 7,196,258 B2 * | 3/2007 | Platt | 84/600 |
| 7,500,258 B1 * | 3/2009 | Eldering | 725/32 |
| 7,752,642 B2 * | 7/2010 | Lemmons | 725/32 |
| 2002/0124246 A1 * | 9/2002 | Kaminsky et al. | 725/9 |
| 2002/0128908 A1 | 9/2002 | Levin et al. | |
| 2003/0115601 A1 | 6/2003 | Palazzo et al. | |
| 2003/0226141 A1 * | 12/2003 | Krasnow et al. | 725/9 |
| 2004/0078265 A1 | 4/2004 | Subramanian et al. | |
| 2004/0163111 A1 | 8/2004 | Palazzo et al. | |
| 2006/0041837 A1 * | 2/2006 | Amir et al. | 715/513 |
| 2006/0149624 A1 * | 7/2006 | Baluja et al. | 705/14 |
| 2007/0042760 A1 * | 2/2007 | Roth | 455/414.3 |
| 2007/0073585 A1 * | 3/2007 | Apple et al. | 705/14 |
| 2007/0233571 A1 * | 10/2007 | Eldering et al. | 705/14 |
| 2008/0027801 A1 * | 1/2008 | Walter et al. | 705/14 |
| 2008/0201731 A1 * | 8/2008 | Howcroft | 725/13 |

* cited by examiner

*Primary Examiner* — Rong Le
(74) *Attorney, Agent, or Firm* — G. Michael Roebuck, PC

(57) ABSTRACT

A computerized method is disclosed for presenting advertising data extracted from a video data stream, the method including storing a plurality of advertising data items extracted from the video data stream at an end user device; and displaying a plurality of sorted advertising indicator data items at the end user device, wherein each of the advertising indicator data items indicates one of the plurality of stored advertising data items. A system is disclosed for performing the method. A data structure is disclosed providing a functional and structural interrelationship between a processor in the system and data in the data structure.

16 Claims, 4 Drawing Sheets

SYSTEM AND METHOD FOR STORING ADVERTISING DATA

FIELD OF THE DISCLOSURE

The present disclosure generally relates to the field of storing advertising data.

BACKGROUND

Many television commercial advertising models rely largely on an end user's ability to remember the advertisement message, including product name and contact information. More specifically, after watching an advertisement or commercial, if an end user wants to act on the information provided in the commercial, the end user must either rely on their memory or remember to record the information with pen and pencil the next time they see the commercial. This extra burden on end users may lead to lost business opportunities based upon the end user's inability to remember the product name and contact information.

DETAILED DESCRIPTION

Figure 1:
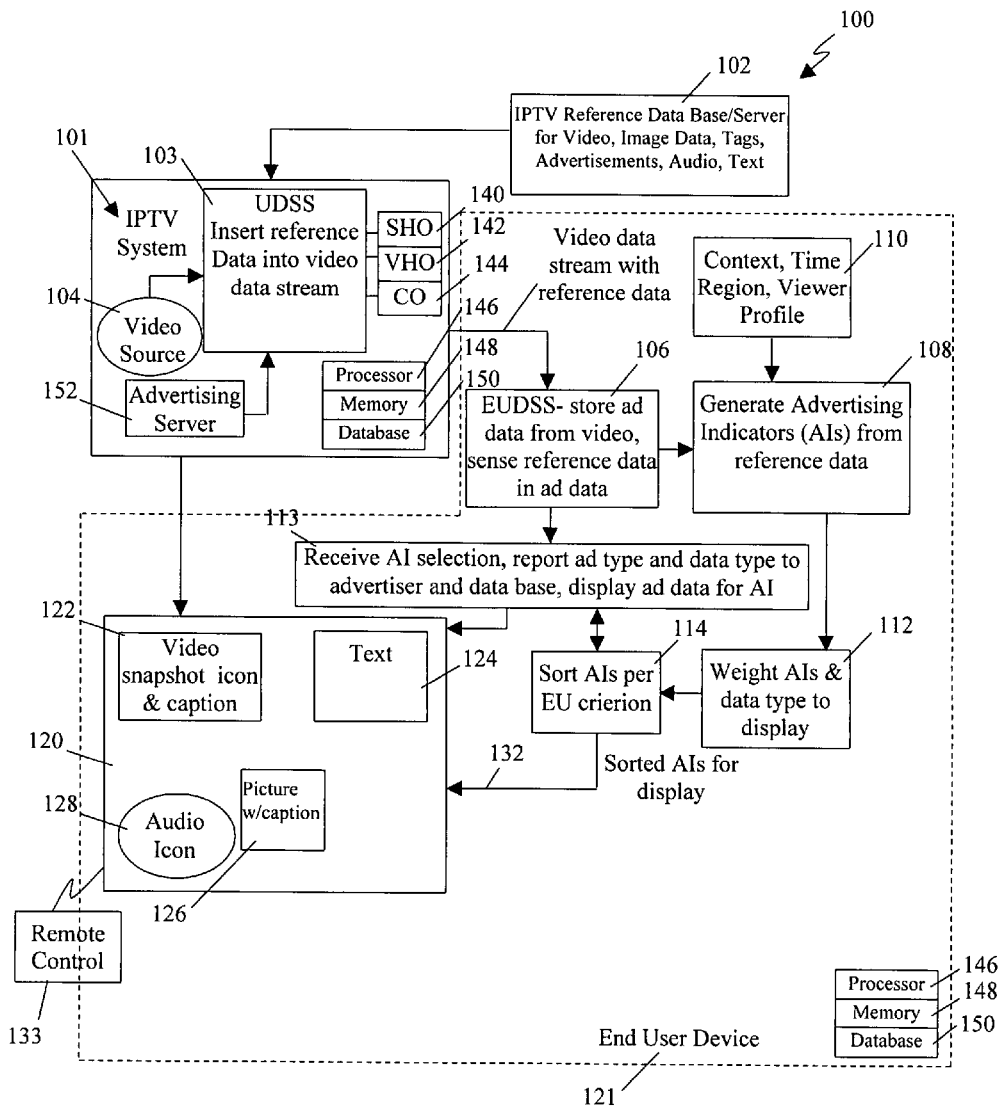
FIG. 1 depicts an illustrative embodiment of a system for presenting stored advertising data extracted from a television signal.

In a particular illustrative embodiment, advertisements including image, video, text and audio data are selected from an incoming video stream at an end user device and stored. The stored advertisements are referred to as advertising data items. The stored advertisements (advertising data items) are represented at the end user device on an end user display. Each stored advertisement is represented on an end user display by a display item such as an icon, snap shot or text extracted from the advertisement. These display items are referred to as advertising indicators or advertising indicator data items since they are items or data that indicate stored advertisements.

The advertising indicators can be sorted for display at the end user device based on the advertisements they represent. The end user can select how they are sorted. The end user can ask that the advertising indicators be sorted based on the date the advertisement was stored, the category of the stored advertisement (sports, new, etc.) or the data type (video, audio, text) of the store advertisement. The end user's tendency to select a particular data type of advertisement can be used for sorting the advertising indicators. For example, if an end user's advertisement storage and/or review selections favor audio over video advertisements, then advertising indicators for audio can sorted out to be presented before the video advertisements on the display. The end user sorting selection is referred to herein as the end user selection criterion.

Excerpts from the advertisements can be added to the displayed advertising indicators when an end user places a cursor over an advertising indicator. The excerpts can be created by taking excerpts of video, audio, text or image data from the advertisement and displaying the excerpts associated with the advertising indicator. The advertisement associated with a particular advertising indicator is displayed when an end user clicks on the advertising indicator.

In another particular illustrative embodiment, data such as company logos or slogans can be recognized in the video data stream. Thus, a company logo can be extracted from a stored advertisement and used in the advertising indicator for the advertisement. Thus, the well known ATT logo can be displayed as an advertising indicator for an ATT advertisement stored at the end user device. The company logos are identified by reference data such as an image of the ATT logo downloaded to the end user device. In a particular illustrative embodiment, the reference data can be inserted into the video data stream at an internet protocol television (ITPV) system server.

In a particular illustrative embodiment a computerized method for presenting advertising data extracted from a video data stream is disclosed. The method includes storing a plurality of advertising data items extracted from the video data stream at an end user device; and displaying sorted advertising indicator data items based on the advertising data items at the end user device, wherein each of the plurality of advertising indicator data items indicates one of the stored advertising data items. In another particular illustrative embodiment the advertising indicator data items are sorted based on end user selected criterion data, wherein the end user selected criterion data is selected from the group consisting of advertising data selection date, advertising data category and advertising data type, wherein the end user selected criterion is applied to the advertising data indicated by the advertising indicator data items. In another particular illustrative embodiment the video stream is received from an internet protocol television (IPTV) system, wherein the advertising data type is applied to the plurality of stored advertising data items, wherein the data type is selected from the group consisting of video, audio, text and image.

In another particular illustrative embodiment the method further includes presenting excerpt data at the end user device, when an end user device remote control places a cursor over one of the plurality of displayed advertising indicator data items, wherein the excerpt data is extracted from the advertising data item indicated by the displayed advertising indicator data items, wherein the excerpt data is selected from the group consisting of video, audio, text, key word and image data. In another particular illustrative embodiment the method further includes sensing reference data in the plurality of stored advertising data items at the end user device, wherein the excerpt data presented further comprises the reference data. In another particular illustrative embodiment the method further includes presenting at the end user device a stored advertising data item indicated by a selected one of the advertising indicator data items.

In another particular illustrative embodiment the advertising indicator data items are sorted further based on an end user tendency to respond to an advertising data type for the advertising data item indicated by each of the advertising indicator data items. In another particular illustrative embodiment the method further includes sensing reference data in the stored advertising data items at the end user device; and selecting reference data for presentation with at least one of the advertising indicator data items. The reference data may be used as a caption displayed along with the advertising indicator data item. In another particular illustrative embodiment the method further includes sending notification data to an advertiser device wherein the notification data indicates that advertising data associated with the advertiser device has been involved in an event selected from the group consisting of advertising data stored and advertising data reviewed. In another particular illustrative embodiment the method further includes receiving targeted advertising at the end user device based an event selected from the group consisting of advertising data stored and advertising data reviewed.

In another particular illustrative embodiment a system for presenting advertising data extracted from a video data stream is disclosed. The system includes a processor in data communication with a computer readable memory and a computer program embedded in the memory. The computer program further includes instructions to store advertising data items extracted from the video data stream at an end user device and instructions to display sorted advertising indicator data items based on the advertising data items at the end user device, wherein each of the advertising indicator data items indicates one of the stored advertising data items. In another particular illustrative embodiment in the computer program the advertising indicator data items are sorted based on end user selected criterion data, wherein the end user selected criterion data is selected from the group consisting of advertising data selection date, advertising data category and advertising data type, wherein the end user selected criterion is applied to the advertising data indicated by the advertising indicator data items.

In another particular illustrative embodiment the video stream is received from an internet protocol television (IPTV) system, wherein the advertising data type is applied to the stored advertising data items, wherein the data type is selected from the group consisting of video, audio, text and image. In another particular illustrative embodiment the computer program further includes instructions to present excerpt data at the end user device, when an end user device remote control places a cursor over one of the plurality of displayed advertising indicator data items, wherein the excerpt data is extracted from the advertising data item indicated by the displayed advertising indicator data items, wherein the excerpt data is selected from the group consisting of video, audio, text, key word and image data.

In another particular illustrative embodiment the computer program further includes instructions to sense reference data in the stored advertising data items at the end user device, wherein the excerpt data presented further comprises the reference data. In another particular illustrative embodiment the computer program further includes instructions to present at the end user device a stored advertising data item indicated by a selected one of the advertising indicator data items. In another particular illustrative embodiment in the computer program the advertising indicator data items are sorted further based on an end user tendency to respond to an advertising data type for the advertising data item indicated by each of the advertising indicator data items.

In a particular illustrative embodiment a computer readable medium having stored thereon a computer program for presenting advertising data extracted from a video data stream is disclosed. The computer program further includes instructions to store advertising data items extracted from the video data stream at an end user device and instructions display a plurality of sorted advertising indicator data items based on the advertising data items at the end user device, wherein each of the advertising indicator data items indicates one of the plurality of stored advertising data items.

In a particular illustrative embodiment a computer readable medium having a data structure embedded thereon is disclosed. The data structure includes a first field for storing data indicating a stored advertising data item; and a second field for storing data indicating an advertising indicator data item for the stored advertising data item, wherein the advertising indicator data item is displayed at an end user device for accessing the advertising data item. In another particular illustrative embodiment the data structure further includes a third field for storing data indicating a caption for the advertising indicator data item.

An illustrative embodiment provides for storage and review of commercial information such as advertisements (also referred to herein as "advertising data") by end users. The illustrative embodiment makes such commercial information more accessible to the end users when they want to review it. In an illustrative embodiment end users may digitally record the advertising data such as interesting commercials, relevant meta-information and reference data, with a touch of the button on the remote control associated with an end user device. The advertising data is stored and organized on a digital medium for end users to recall from storage to review and browse later using the same or a similar remote control and an end user display.

In an illustrative embodiment of the system and method, meta-information and reference data for each commercial is transmitted in the video data stream along with the original video signal from an internet protocol television (IPTV) system. Such information may consist of a commercial begin and end signal, company name, company contact phone number and/or email address, product name, other claims made by the commercial, e.g. price, warranty, etc. In particular illustrative embodiments, the reference data includes image, video, audio and text data such as advertising logos and slogans. The reference data may be inserted into the advertising data or sent separately in the video data stream.

The beginning and end signals may be used by the recording device to capture complete advertising data; irrespective of the point in the commercial the record button is pressed. Other meta-information, reference data and excerpts from the advertising data may be used by the recording device to present an organized display of advertising indicators and excerpts from the commercials so that end users may conveniently browse the advertising indicators for the stored advertising data. For example, end users may be presented a menu of advertising indicator data items (or "AI's") representing stored advertising data by company name, company logo, image and caption, key word, product name, dates and time the advertising was stored, etc.

The AI's are presented at the end user device in the form of icons, image snapshot or excerpt of data (the excerpt data may be image, video, audio, HTML or text data) from the stored adverting data along with a caption generated from the reference data. Once the end user selects a specific commercial or advertisement (advertising data) associated with a particular AI, the end user has a choice to play the commercial (advertising data) by clicking on the AI or to browse all the meta-information and/or reference data or see and/or hear a short excerpt of audio, video, text or image data extracted from the advertising data by placing a cursor over the AI. In an illustrative embodiment, if the company's phone number, uniform resource indicator (URI), HTML web page, or email is available, the end user may contact the company by pressing a button on the remote control to dial the company, send an email or access the company web site via the URI or HTML page.

In a particular illustrative embodiment, reference data such as company logos and slogans can be inserted into the video data stream. This reference data is then sensed and extracted from the video data stream at an end user device. Turning now to FIG. 1, FIG. 1 shows an illustrative embodiment of a television signal delivery system, an internet protocol television (IPTV) system 101 and an end user device for storing and presenting advertising data. The IPTV system includes servers that form a digital IPTV network that streams internet protocol (IP) video data including advertising data and reference data from a super head end (SHO) server 140, video head end (VHO) server 142, or central office (CO) server 144 to a end user data sensing and storage system (EUDSS) 106 at an end user device. Thus, the IPTV system comprises a hierarchical network of servers (SHO, VHO, CO) that hierarchically distribute video data streams including advertising data and reference data to smaller geographic regions and finally to an end user device 121 such as a set top box device (STB).

The SHO server delivers national video data (including image, video, text and audio data) content in the form of a television signal (digital video data stream) to regional VHO server, which redistributes the video data stream to sub regional CO servers. Each SHO, VHO, CO and end user device 121 contains an advertising/video data server having a processor 146, computer readable medium collectively referred to as memory 148 and database 150. The upstream data sensing system (UDSS) 103 and EUDSS 106 sense data of different types that appear in the video data stream television signal. The EUDSS and UDSS compare television signal data to reference data to sense data in the television signal that matches or is substantially similar to the reference data.

Reference data that is inserted by the UDSS 103 is sensed at the EUDSS by comparing the inserted reference data to a reference data queue of reference data sent to each end user device. Thus different end users may receive different queues and sense different reference data at their respective EUDSS's. Each queue can contain different demographic reference data or regional reference data such as images, text or audio data so that each end user senses different geographic or regional reference data in the video data stream based on the queue of reference data and weighting data sent to their end user device. The queues, reference data and weighting data are stored in a data structure or database embedded in a computer readable medium accessible to a processor at the IPTV server or end user device.

The data sensed in the television signal or IPTV video data stream may be of different data types, including but not limited to video data, image data, text data and audio data. The EUDSS 106 senses or recognizes video data, image data, text data and audio data in the television signal or video data stream to generate keywords from the combination of the images, audio and text data sensed in the incoming video signal. In a particular illustrative embodiment, the incoming television signal is a digital video data stream, delivered from an IPTV system network of servers. In another particular illustrative embodiment, the television signal is a digital television video signal delivered over a broadcast cable system. In another particular illustrative embodiment, the television signal is an analog television signal delivered over a radio frequency antenna. In another particular illustrative embodiment, reference video data, reference image data, reference text data, reference audio data and weighting (herein after referred to as "reference data") are inserted into the video data stream television signal by the UDSS in the IPTV system.

The weighting data can be inserted into the television signal or sent separately to an end user device. The weighting data is used to weight data types, regional reference data and viewer or demographic tendency to respond to a data type. The reference data can be sensed by a EUDSS 106 at an end user device 121 such as a set top box.

In another particular embodiment, the end user device is a mobile internet protocol (IP) device including but not limited to a cell phone, personal data assistant or a web tablet. The reference data is compared to video, audio, image and text data in the incoming television signal to select related information data and advertising data for presentation concurrently or offered via an icon to be selected for presentation concurrently along with the incoming television signal on the end user device. As an end user responds to a particular data type by selecting a particular advertising data or related information data for viewing, the end user response to the data type is recorded to determine the end user's response tendency for the data type.

The reference data weighting data is used to weight reference data according to the data type, geographic region and according to a tendency to respond to a particular data type of an end user or an end user's demographic. Each end user's response to a particular data type is recorded and stored at the end user device. A tendency for each user to respond to a data type is determined from the recorded responses and used to determine a tendency of an end user to respond to the data type. Weights are assigned to data types based on the user's response tendency each data type (image, video, audio, text). These tendencies are reported to the IPTV system servers for use by advertisers in directing targeted advertising to the end user and the end user's demographic group. Thus, weighting data for each end user and end user demographic group can be stored at the IPTV server and used to distribute weighting data to demographic groups of end users and individual end users.

The weighting data is used to sort display of the AI's discussed below. In a particular illustrative embodiment the weighting data that may be included is a set of weights assigning data type weights, response tendency weights, viewer profile weights, or regional weights. In another particular embodiment the weighting data includes weighted reference data, which is used to favor selection of the weighted data type from reference data sensed in the video data stream or stored adverting data by the EUDSS. Thus the weighted reference data will be favored or weighted more heavily than other reference data sensed in the video data stream or stored advertising data by the EUDSS. For example if a particular end user or a demographic for a particular end user has a tendency to respond more to text data than audio data, then sensed reference text data will be weighted more heavily than sensed audio data.

Similarly, if an end user is in a particular demographic group with a known response to particular data types or a particular end user has a tendency to respond more to video or image data than text data, then sensed reference video or image data will be weighted more heavily than sensed text data for the particular end user or demographic group of end users. The weighted sensed data is used to sort AI's displayed to an end user on an end user device. Thus, for an end user more responsive to text data, AI's based on text related information is weighted more than video, audio and image data so that AI text data is displayed first (upper left on the on the end user display screen) to the particular end user. Since most end user read top to bottom, left to right, top left is the highest priority display for an AI and bottom right is the lowest priority display for an AI. The weighting data is used in sorting the display of AI's according to priority of presentation on the display.

Reference data can be supplied to the EUDSS 106 by a general reference data database 103 or by an advertiser reference data database 102. The advertiser reference data database 102 can contain video data, image data, audio data, text data, data tags and advertisements which can be used for selection and presentation of related information and advertising data for human perception and selection as presented on an end user device with video provided by the IPTV system. The advertiser or other user can sense data in the upstream data sensing system 103 to select reference data associated with sensed video data in the television signal to insert into the video data stream. The advertiser or user can select regions, data types and demographics by selecting weighting data or weighted reference data for insertion into the television signal or downloading to an end user device from the IPTV network SHO, VHO or CO. Each reference data can have a particular weight assigned to it in the database and can be used to weight sensing of the reference data. Keywords associated with reference data can be weighted by the particular weights for sorting AI's for display or adding captions to AI's. The weighting data for the reference data can be included in a separate download to the end user device and stored in memory in a data structure or database embedded in a computer readable medium.

In an illustrative embodiment the data sensing device recognizes images, text and audio data passages to select related information and to generate AI's and AI excerpts or captions for sorted display. The matched reference data or keywords are sent to system 108 where the matched reference data or keywords are weighted according to their weights and their significance of the media or data type of which they were recognized including audio, video, image and text or optical character recognition (OCR) in system 108. The audio and text passages included keywords that are identified using speech recognition and text recognition techniques. A default weighting data for data type weight is assigned on a scale of 10, for audio data=7, video/image data=5, and text data=3. Those weights can be adjusted by weighting the reference data downloaded to the end user device. Additional weight is assigned to keywords (e.g., football, Corvette, Wild at Heart) in the same category (e.g., sports, politics, cars, movies, etc.) appearing in more than one data type at substantially the same time (e.g., within 2 seconds). Thus if the image of a football and the word "football" which are in the same category, i.e., sports, are sensed in the television signal at the same or close to the same time, additional weight is assigned to the keyword football.

The keywords can also be weighted by the context, which includes time of day, geographic region and current viewer profile, response tendency, demographic, which is provided by system 110. Thus the keyword "Dallas Cowboys" can be assigned more weight in Texas than Washington, D.C. The keywords, which are weighted according to the inputs in block 108, are sent to system 112 where the AI's are weighted.

AI's are displayed on end user display 120 and sorted by data type of the stored advertising data item represented by the advertising indicator. Thus, if AI priority order (top left to bottom right) for display is by data type in the following order of priority video, text, audio and image, AI's for video advertising data are presented in sorted order in area 122, AI's for text advertising data are presented in sorted order in area 124, AI's for image advertising data are presented in sorted order in area 126, AI's for audio advertising data are presented in sorted order in area 128 on the end user display 120. An audio icon 128 can be presented on the display for indication that stored audio advertising data are available so that when a user clicks on the audio icon using a remote control 133 to communicate with the processor 148 and presentation device 120 can present the audio advertising data from built in speaker associated with the end user display.

In an illustrative embodiment the EUDSS 106 takes input from an end user remote control 133 to store selected advertising data extracted from the video data stream. The EUDSS also senses reference data in the stored advertising data. In block 108 a function is performed by processor 146 to generate advertising indicators and caption based on key words from the reference data sensed in the advertising data. The reference data and key words include image, text, audio and video data. A context is recorded in system function block 110 wherein the processor records time of day, viewer profile, program viewed and region associated with the selected advertising data for storage.

In block 114 the AI's are sorted per an end user (EU) selected criterion for display. The end user criterion is applied to the underlying advertising data represented by the advertising indicators. The end user criterion may include but is not limited to advertising category (film, fashion, news, travel, sports, etc.), context or by time at which the advertising data is stored. The end user criterion is set to default to sort by time of storage. The advertising indicators may also be sorted based on an end user's tendency to respond to a particular data type. When an end user selects a particular AI by placing a cursor over the AI and clicking on the AI, the advertising data associated with the AI is displayed on the end user device display. A report is sent to the IPTV system advertising server indicating that an advertisement associated with a particular advertiser has been stored and reviewed by a particular end user. The advertiser can send additional targeted advertising to the end user based on the reported viewing of the advertisement by the end user. The report includes data type, advertising category, context and end user demographics for the end user that stored and reviewed advertising data. A similar report is also sent to the IPTV advertising server when the advertising data is stored.

Figure 2:
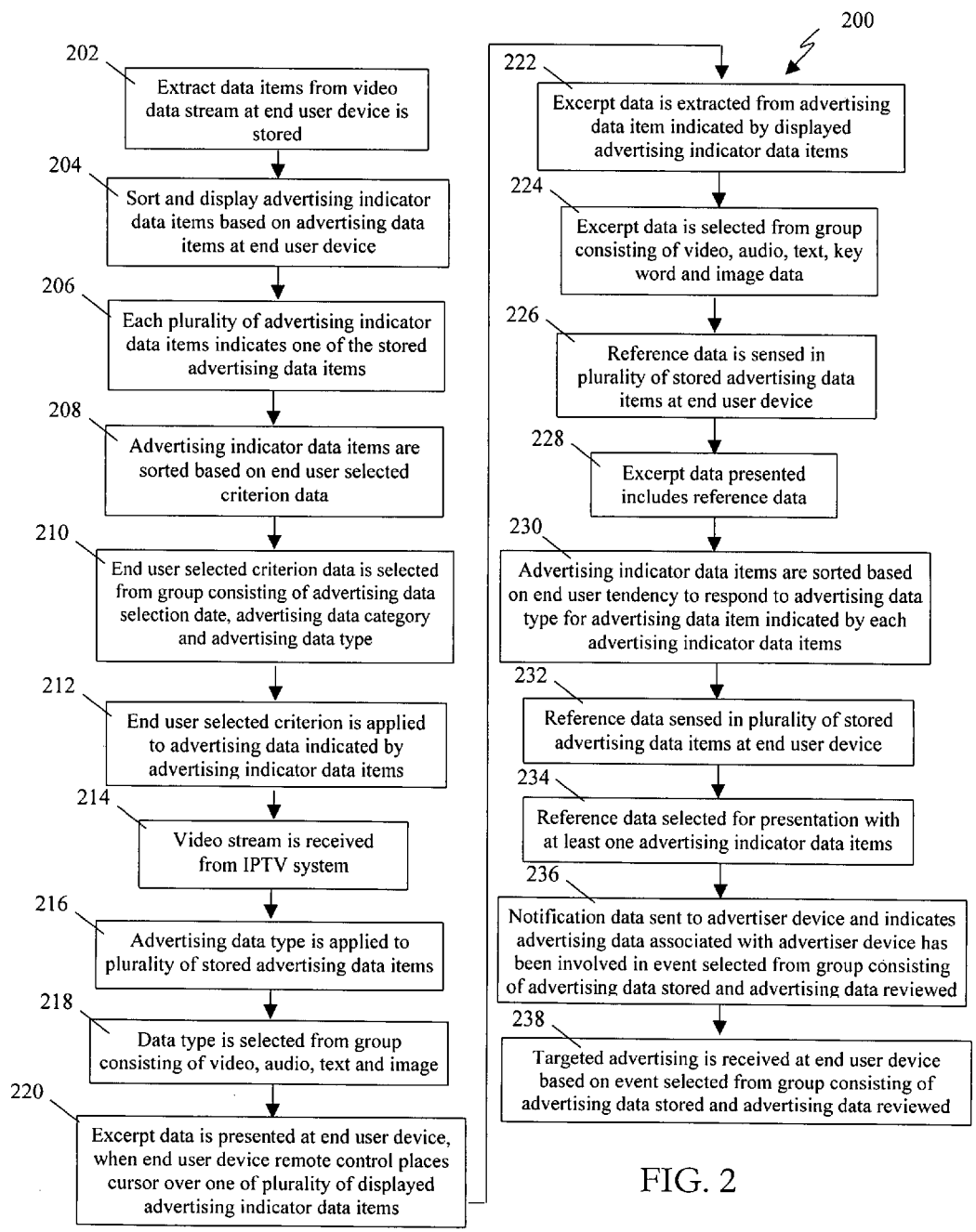
FIG. 2 depicts a flow chart of functions performed in a method for presenting advertising data extracted from a video stream.

Turning now to FIG. 2 in an illustrative embodiment a series of functions are performed to provide storage and retrieval of advertising data. The functions include but are not limited to reference data sensing, recognition and categorization for advertising indicator data presentation and generation of excerpts and captions for presentation along with the advertising indicator data. A flow chart 200 illustrates a series of functions and acts in an illustrative embodiment, which are used to perform the functions described herein.

In block 202 advertising data items are extracted from a video data stream at an end user device and are stored. In block 204 the advertising indictor data items are sorted based on advertising data items at the end user device is displayed. In block 206 each of the advertising indicator data items indicates one of the stored advertising data items. In block 208 advertising indicator data items are sorted based on an end user selected criterion data. In block 210 the end user selected criterion data is selected from a group consisting of advertising data selection date, advertising data category and advertising data type. At block 212 the end user selected criterion is applied to advertising data indicated by advertising indicator data items.

At block 214 the video stream is received from an IPTV system. At block 216 advertising data type is applied to the stored advertising data items. At block 218 the data type is selected from a group consisting of video, audio, text and image. At block 220 excerpt data is presented at the end user device, when the end user device remote control places the cursor over one of a plurality of displayed advertising indicator data items. At block 222 the excerpt data is extracted from advertising data item indicated by the displayed advertising indicator data items. Reference data may be used to form the excerpt data. Thus a company or advertiser can insert reference data such as image data for a company logo or text data for a company slogan in the video data stream as reference data which can be sensed and presented with an advertising indicator as a caption or excerpt. At block 224 the excerpt data is selected from the group consisting of video, audio, text, key word and image data. In block 226 reference data is sensed in a plurality of stored advertising data items at the end user device.

At block 228 the excerpt data presented includes reference data. At block 230 a plurality of advertising indicator data items are sorted based on end user tendency to respond to advertising data type for advertising data item indicated by each advertising indicator data items. At block 232 reference data is sensed in a plurality of stored advertising data items at the end user device. At block 234 reference data selected for presentation with at least one advertising indicator data items. At block 236 notification data is sent to advertiser device and indicates advertising data associated with advertiser device has been involved in event selected from a group consisting of advertising data stored and advertising data reviewed. At block 238 targeted advertising is received at end user device based on event selected from group consisting of advertising data stored and advertising data reviewed.

Figure 3:
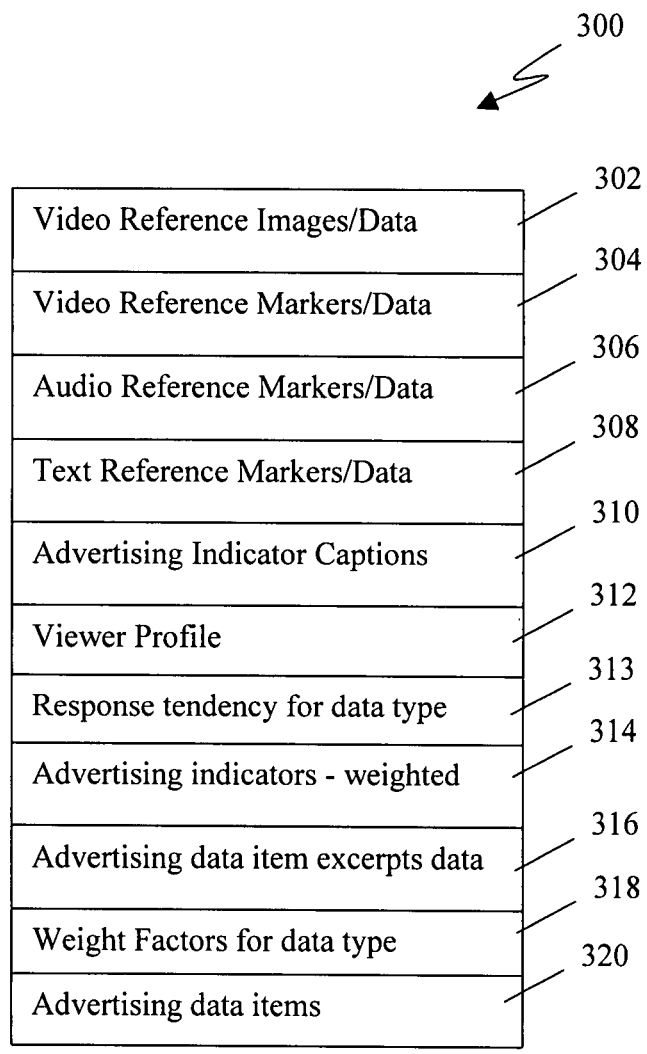
FIG. 3 depicts a data structure embedded in a computer readable medium that is used by a processor and method for presenting stored advertising data extracted from a video data stream.

Turning now to FIG. 3 in a particular illustrative embodiment a data structure 300 embedded in a computer readable medium for providing a structural and functional interrelationship between the data in the data structure and a processor, processor software or method for presenting data related to a video data stream. In block 302 a video reference image field is illustrated in which data is contained indicating a particular video reference image, or a plurality of particular video reference images for use by an UDSS or EUDSS in sensing video reference images. Video reference data weighting data are also contained in block 304 a video marker field is illustrated in which data is contained indicating a particular video data marker for use by an UDSS or EUDSS in sensing a video marker in a video data. In block 306 an audio reference data, weighting and marker field is illustrated in which data is contained indicating a particular audio reference data, weighting and marker for use in a UDSS or EUDSS for sensing and weighting an audio reference and audio marker data in the television signal. In block 308 a reference data, weighting and text marker field is illustrated in which data is contained indicating a particular text reference data and marker data for use in sensing and weighting text data.

In block 310 an advertising indicator data item caption field is illustrated for storing data indicating a caption for presentation with an advertising indicator data item. In block 312 a viewer profile field is illustrated in which data is contained indicating a particular viewer profile. The viewer profile can include but is not limited to demographic data, weighting data, viewer history data, interest data, geographic location data, etc. In block 313 a response tendency field is illustrated for storing data indicating a viewer data type response tendency. In block 314 an advertising indicator field is provided for storing data indicating AI's associated with a particular end user device. In block 316 an advertising data extract field is provided for storing data extracted from each advertising data item associated with each AI.

In block 318 a weight factors field is illustrated in which data is contained indicating a particular weight factor for each data type (audio, video, text, and image) based on a response tendency of the end user or an end user demographic. In block 320 an advertising data field is illustrated for storing advertising data. The advertising data can be stored and accessed in a data base or data structure embedded in a computer readable medium located at an IPTV advertising server or located at an end user device.

Figure 4:
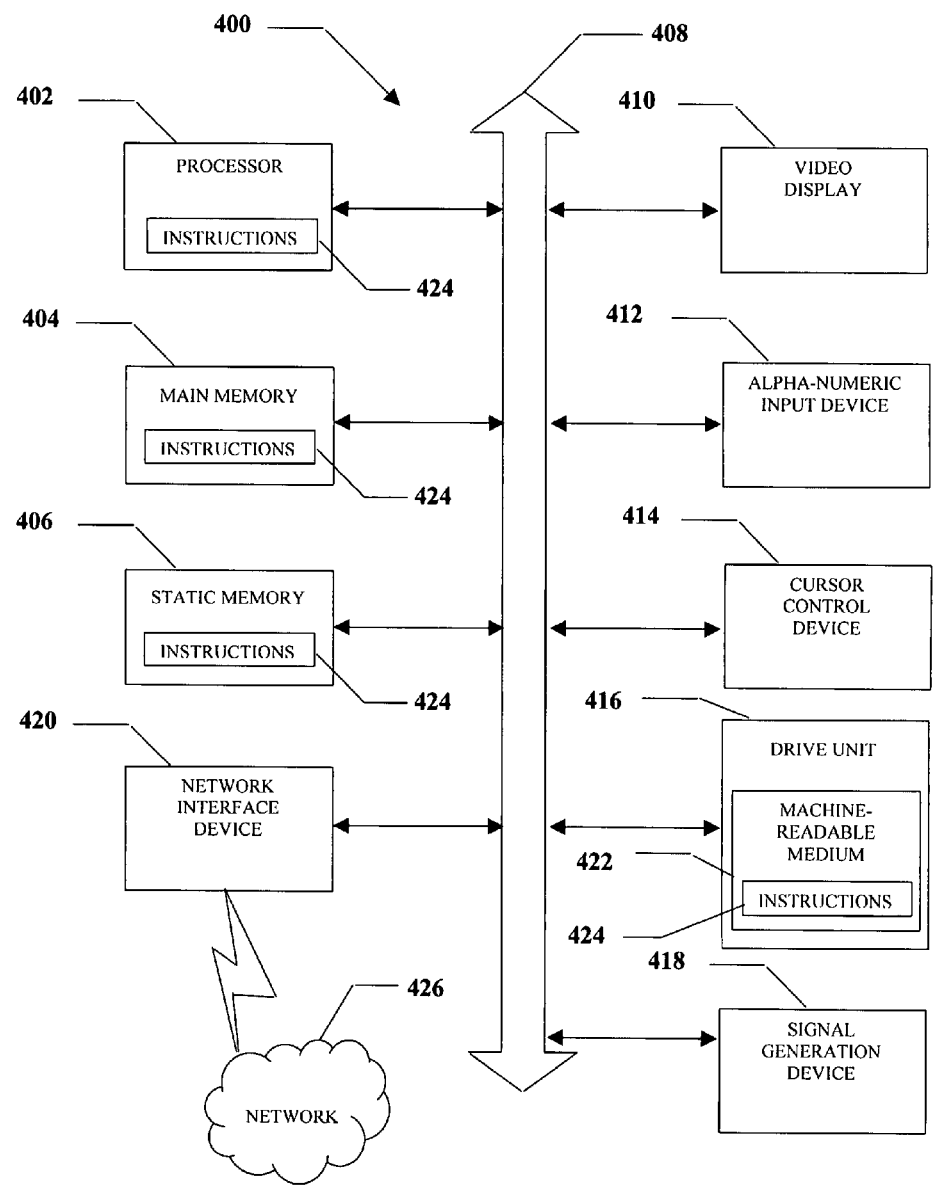
FIG. 4 is an illustrative embodiment of a machine for performing functions disclosed in an illustrative embodiment.

FIG. 4 is a diagrammatic representation of a machine in the form of a computer system 400 within which a set of instructions, when executed, may cause the machine to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a set-top box (STB), a Personal Digital Assistant (PDA), a cellular telephone, a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine.

It will be understood that a device of the present invention includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 400 may include a processor 402 (e.g., a central processing unit (CPU), a graphics processing unit (GPU), or both), a main memory 404 and a static memory 406, which communicate with each other via a bus 408. The computer system 400 may further include a video display unit 410 (e.g., liquid crystals display (LCD), a flat panel, a solid state display, or a cathode ray tube (CRT)). The computer system 400 may include an input device 412 (e.g., a keyboard), a cursor control device 414 (e.g., a mouse), a disk drive unit 416, a signal generation device 418 (e.g., a speaker or remote control) and a network interface.

The disk drive unit 416 may include a machine-readable medium 422 on which is stored one or more sets of instructions (e.g., software 424) embodying any one or more of the methodologies or functions described herein, including those methods illustrated in herein above. The instructions 424 may also reside, completely or at least partially, within the main memory 404, the static memory 406, and/or within the processor 402 during execution thereof by the computer system 400. The main memory 404 and the processor 402 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present invention, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present invention contemplates a machine readable medium containing instructions 424, or that which receives and executes instructions 424 from a propagated signal so that a device connected to a network environment 426 can send or receive voice, video or data, and to communicate over the network 426 using the instructions 424. The instructions 424 may further be transmitted or received over a network 426 via the network interface device 420. The machine readable medium may also contain a data structure for containing data useful in providing a functional relationship between the data and a machine or computer in an illustrative embodiment of the disclosed system and method.

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the invention is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived there from, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computerized method for presenting advertising data extracted from a video data stream, the method comprising:
    receiving the video data stream from an internet protocol television server;
    storing a plurality of advertising data items extracted from the video data stream at an end user device;
    determining one of a plurality of advertising data types; and
    presenting on a display at the end user device, a plurality of sorted advertising indicators based on the plurality of advertising data items, wherein each of the plurality of advertising indicators indicates one of a plurality of stored advertising data items, wherein the sorted advertising indicators are sorted on the display based on a tendency of an end user's to respond to one of the plurality of advertising data types determined by recording an end user response to each of the plurality of advertising data types, wherein the plurality of advertising data types comprise at least two of audio, video, text and image data types.

2. The method of claim 1, further comprising: presenting excerpt data at the end user device, when an end user device remote control places a cursor displayed over one of the plurality of displayed advertising indicators, wherein the excerpt data is extracted from the advertising data item indicated by the one displayed advertising indicator, wherein the excerpt data is selected from the group consisting of video, audio, text, key word and image data.

3. The method of claim 2, further comprising: sensing reference data in the excerpt data; at the end user device wherein the advertising data extracted from the video stream data presented further comprises data selected from the group consisting of video, audio, text and image reference data; and sending the reference data to an internet protocol television server for updating a profile for the end user.

4. The method of claim 1, further comprising: presenting at the end user device a stored advertising data item indicated by a selected one of the Sorted advertising indicators.

5. The method of claim 1, wherein the plurality of advertising indicators are displayed in priority based on the tendency of the end user at the end user device to respond to an advertising data type selected from the group consisting of video, audio, text and image data types.

6. The method of claim 1, further comprising: sensing in the plurality of stored advertising data items at the end user device video reference data extracted from the video data stream; and selecting the video reference data for presentation with at least one of the advertising indicators.

7. The method of claim 1, further comprising: sending notification data to an advertiser device wherein the notification data indicates advertising data associated with the advertiser device has been involved in an event selected from the group consisting of advertising data stored and advertising data reviewed.

8. The method of claim 7, further comprising: receiving targeted advertising at the end user device based on the event.

9. A system for presenting advertising data extracted from a video data stream, the system comprising:
   a processor in data communication with a tangible non-transitory computer readable medium; and a computer program embedded in the computer readable medium, the computer program further comprising:
   instructions to receive the video data stream from an internet protocol television (IPTV) server;
   instructions to store a plurality of advertising data items extracted from the video data stream at an end user device; instructions to determine one of a plurality of advertising data types; and instructions to display a plurality of sorted advertising indicators based on the advertising data items at the end user device, wherein each of the plurality of sorted advertising indicators indicates one of the plurality of stored advertising data items, and wherein the plurality of advertising indicators are sorted on the display in priority order as determined by recording a tendency of an end user at the end user device to respond to a particular one of the plurality of wherein the plurality of advertising data types are at least two audio, video, text and image data.

10. The system of claim 9, wherein in the computer program the advertising indicators are sorted based on end user selected criterion data, wherein the end user selected criterion data is selected from the group consisting of advertising data selection date, advertising data category and advertising data type, wherein the end user selected criterion is applied to the advertising data indicated by the advertising indicators.

11. The system of claim 10, wherein the video stream is received from an internet protocol television system, wherein the advertising data type is applied to the plurality of stored advertising data items, and wherein the data type is selected from the group consisting of video, audio, text and image.

12. The system of claim 10, wherein in the computer program the plurality of advertising indicators are sorted further based on recording a tendency of an end user at the end user device to respond to an advertising data type for the advertising data item indicated by each of the advertising indicators.

13. The system of claim 9, the computer program further comprising instructions to present excerpt data at the end user device when a cursor is placed over one of the plurality of displayed advertising indicators, wherein the excerpt data is extracted from the advertising data item indicated by the one of the plurality of sorted advertising indicators, wherein the excerpt data is selected from the group consisting of video, audio, text, key word and image data.

14. The system of claim 13, the computer program further comprising instructions to sense reference data in the plurality of stored advertising data items at the end user device, wherein the excerpt data presented further comprises the reference data.

15. The system of claim 9, the computer program further comprising instructions to present at the end user device a stored advertising data item indicated by a selected one of the plurality of sorted advertising indicators.

16. A tangible non-transitory computer readable storage medium having stored thereon a computer program for presenting advertising data extracted from a video data stream, the computer program further comprising: instructions to receive the video data stream from an internet protocol television (IPTV) server;
   instructions to store a plurality of advertising data items extracted from the video data stream at an end user device and instructions display a plurality of sorted advertising indicators based on the advertising data items at the end user device, wherein each of the plurality of advertising indicators indicates one of the plurality of stored advertising data items, instructions to determine one of a plurality of advertising data types wherein the plurality of advertising data types are at least two of audio, video, text and image data; wherein the advertising indicators are sorted on the display determined by recording a tendency of an end user at the end user device to respond to a particular one of the plurality of advertising data types.

\* \* \* \* \*